Dec. 29, 1925.

A. VEILLETTE 1,567,557

EYEGLASS CONSTRUCTION

Filed Jan. 27, 1921

Alfons Veillette, Inventor

By his Attorneys

Patented Dec. 29, 1925.

1,567,557

UNITED STATES PATENT OFFICE.

ALFRED VEILLETTE, OF ATTLEBORO, MASSACHUSETTS, ASSIGNOR TO BAY STATE OPTICAL COMPANY, OF ATTLEBORO, MASSACHUSETTS, A CORPORATION OF MAINE.

EYEGLASS CONSTRUCTION.

Application filed January 27, 1921. Serial No. 440,263.

*To all whom it may concern:*

Be it known that I, ALFRED VEILLETTE, a citizen of the United States, and a resident of Attleboro, in the county of Bristol and State of Massachusetts, have invented an Improvement in Eyeglass Constructions, of which the following is a specification.

This invention relates to eyeglass construction, and with regard to certain more specific features thereof, to constructions of such type in which the swinging lever or finger-piece is evolved. One of the objects thereof is to provide a strong and durable eyeglass construction in which the parts are not only securely held together but act with a high degree of efficiency. Another object is to provide a practical construction of the above type which shall be inexpensive and simple and which shall also be unaffected by conditions of use. Another object is to provide a practical eyeglass construction in which replacements may be made with a minimum chance of loss of parts. Other objects will be in part obvious and in part pointed out hereinafter.

The invention accordingly consists in the features of construction, combinations of elements and arrangement of parts which will be exemplified in the structure hereinafter described and the scope of the application of which will be indicated in the following claims.

Referring now to the accompanying drawings, in which is shown one of various possible embodiments of this invention, Figure 1 is a rear elevation;

Similar reference characters refer to similar parts throughout the several views of the drawings.

Figure 1:
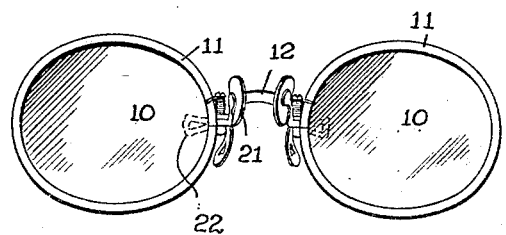

Referring now to Figure 1 of the drawings, there is shown a pair of eyeglasses, and it may here be noted that the term "eyeglasses" is used in a broad sense to comprehend not only devices which are mounted upon and grip the nose, but those which are held in position by temple bars or the like. The eyeglasses here shown comprise the lenses 10 and rims 11 connected by the bridge 12. As the construction at each side of the eyeglasses is substantially the same, that upon one side only will here be set forth.

Figure 2:
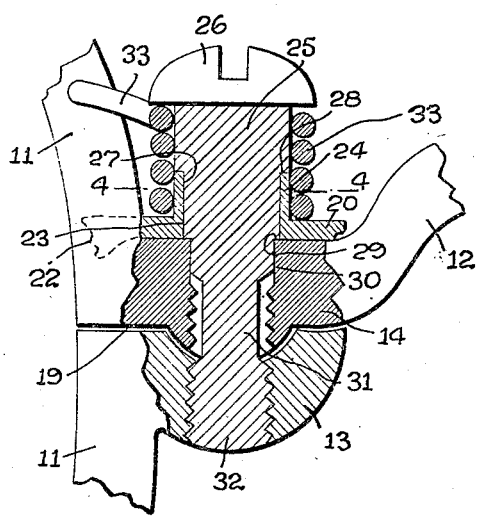
Figure 2 is a vertical sectional elevation taken through the axis of one of the connecting mechanisms shown in Figure 1 and on a larger scale.
Figure 3:
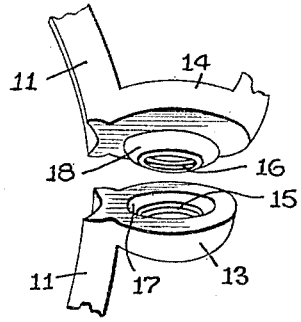
Figure 3 is a perspective view showing the end members of a rim separated one from the other.

As shown more in detail in Figure 2 of the drawings, the rim 11 which may be of any desired construction is provided with lower and upper end members 13 and 14 respectively, the latter of which is formed on or secured to the bridge 12. These end members as best shown in Figure 3 of the drawings are provided with threaded openings 15 and 16 adapted to be brought into alignment. Also the member 15 is preferably formed of a cup shaped depression 17 into which a similarly shaped boss 18 on the upper member is adapted to fit. This latter interfitting construction not only lines up the threaded holes 15 and 16 but tends to hold them in alignment and add to the strength and security of the joint.

The upper end member 14 is formed on its upper surface to provide a field or bearing 19 for a swinging finger-piece or guard lever 20. The latter member is provided on its rear arm with any desired form of nose-engaging device 21, and upon its forward end with a finger grip 22 by which it may be swung in the usual manner.

The guard arm 20 has a central opening 23 about which is formed an up-standing circular flange 24 which is preferably forced up out of the metal of the part 20 and integral therewith.

To secure these various parts together and perform other functions, there is provided a pivotal or screw member 25 having the ordinary screw head 26. The upper portion of this member is grooved or recessed as at 27 to fit within the flange 24 and guard arm 20 and position the flange to present an outer surface flush with the outer surface of the portion of the screw above the shoulder 28.

At the plane of the lower surface of the guard arm 20 the screw 25 is provided with another shoulder 29 which rests upon the member 14 and limits the downward movement of the screw in such position that the guard arm 20 will be snugly held by the shoulder 28 and yet will be permitted entire freedom of movement in swinging upon the member 14.

Beneath the shoulder 29 the screw 25 is provided first with a smooth surface 30, which fits within a similar surface at the upper end of the passage 16 through the part 14. Further down the shank of the screw is contracted as at 31 and at its lower end expanded as at 32 when threaded to fit within the threads of the hole 15 through the end member 13.

Prior to consideration of the action of these various parts, it may first be noted that by the term "forward" is meant the direction in which one looks with the eyeglasses in position, and by the term "inward" is meant the direction toward the center of the eyeglasses as a whole.

Figure 4:
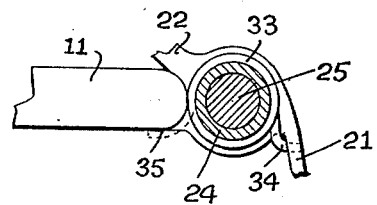
Figure 4 is a sectional plan taken on the line 4—4 of Figure 2 showing the parts on a slightly reduced scale.

With the parts in position as shown in Figure 4 of the drawings, the portion 32 of the screw bears only in the member 13 and hence upon its being tightened in the latter member, the shoulder 29 will press downwardly upon the part which it engages and the part 13 will be drawn upwardly to any desired extent to clamp the lens in position in the rim.

This action however does not unduly tighten the grip of the screw upon the guard arm, for as hereinbefore explained, the distance between the shoulders 28 and 29 is just sufficient to permit a snug engagement and yet free movement between these parts. With the parts thus acting, the spring 33 which is coiled about the outer surface of the flange 24 and the upper portion of the screw, acts to swing the nose-engaging device 21 inwardly by reason of its engagement with the guard arm as at 34 in Figure 4 of the drawings and with the rim as at 35. This movement of the spring and swinging of the guard arm has no loosening effect on the screw for the latter is driven downwardly with any desired tightness, and the fit between the inner surface of the flange 24 and the screw is such as to give a smooth and yet free bearing. Furthermore, these results including the tight clamping of the rim are attained by the single integral member 31, the strength of which is obviously ample to meet any stresses encountered in use.

When it is desired to open the rim as for the purpose of changing a lens, the screw 25 is drawn upwardly, its threaded lower end passing smoothly into the threaded lower end of the opening 16. When the screw leaves the member 13, it will be securely inter-threaded with the member 14 and thus there is no chance of mislaying the parts connected thereby. In fact, they are all as securely held together as though the device were in its fully connected position. The lower member 13 however is free for separation from the member 14 as illustrated in Figure 3 of the drawings. When the lens has been placed in position, the parts 17 and 18 exactly align the threaded openings and as the screw is driven downwardly, its threaded portion passes out of the member 14 and into the member 13 into the position shown in Figure 2.

It is to be understood however that if for any reason it is desired to separate the various parts, all that is necessary is to continue the unscrewing or upward movement of the screw 25 whereupon they may all be removed one from the other.

It will thus be seen that there is provided a construction in which the several objects of this invention are achieved and that the various features of the device shown co-act in achieving the advantages hereinbefore set forth.

As various possible embodiments might be made of the above invention and as various changes might be made in the embodiment above set forth, it is to be understood that all matter herein set forth or shown in the accompanying drawings is to be interpreted as illustrative and not in a limiting sense.

I claim as my invention:

1. In eyeglass construction, in combination, an eyeglass frame member having a pair of substantially registering end members, one of said end members having a projecting part and an opening passing through said projecting part, said opening having a threaded portion and an unthreaded portion, the other of said end members having a recess with which said projecting part mates and having a threaded opening at said recessed portion registering with said first opening and forming therewith a continuous threaded passage, and a threaded connecting device coacting with said openings, having a portion adapted to mate with said unthreaded portion of said first passage and shaped to be brought into threaded engagement with either of said end members exclusively of the other.

2. In eyeglass construction, in combination, an eyeglass rim member having a pair of oppositely disposed ends, an end member formed integral with said rim member and extending outwardly from one of said oppositely disposed ends thereof to form a bridge and having an opening therein having a threaded portion and an unthreaded portion, a second end member formed integral with said rim member projecting outwardly from the other of said oppositely disposed ends thereof and having a threaded opening registering with said first opening, a connecting screw adapted to be threaded into said registering threaded openings, and a nose lever pivoted upon said screw and resting upon said first end member, said screw having a portion adapted to mate with said unthreaded portion of said first opening and being shaped to be brought into threaded engagement with either of said end members exclusively of the other.

3. In eyeglass construction, in combination, a frame member having a threaded opening, a second frame member having an opening adapted to register with said first opening and threaded throughout a portion thereof, the remaining portion being unthreaded and of greater diameter than said threaded portion, and a connecting screw entering said openings having a threaded end portion adapted to coact with said threads of said first opening, a portion of reduced diameter adapted to clear said threads of said second opening and a portion adapted to mate with said unthreaded portion of said second opening.

4. In eyeglass construction, in combination, a frame member having a threaded opening, a second frame member adapted to rest upon said first frame member and having an opening adapted to register with said first opening, said opening being threaded throughout its lower portion, the upper portion thereof being unthreaded, and a connecting screw coacting with said openings having a threaded end portion adapted to engage said threads of said first opening exclusively of those of said second opening, a portion of reduced diameter adapted to clear said threads of said second opening and a portion adapted to mate with said unthreaded portion of said second opening.

5. In eyeglass construction, in combination, a frame member having a threaded opening, a second frame member adapted to rest upon said first frame member and having an opening adapted to register with said first opening, said opening being threaded throughout its lower portion, the upper portion thereof being unthreaded, and a connecting screw coacting with said openings having a threaded end portion adapted to engage said threads of said first opening exclusively of those of said second opening, a portion of reduced diameter adapted to clear said threads of said second opening, a portion adapted to mate with said unthreaded portion of said second opening, and a shoulder above said last portion limiting its movement into said openings.

6. In eyeglass construction, in combination, an eyeglass frame having a pair of substantially registering end members, one of said end members having an opening therethrough having a threaded portion and an unthreaded portion, and the other of said end members having an opening registering with said first opening and threaded, a connecting member adapted to secure said end members together, having a portion adapted to mate with said unthreaded portion of said first opening and a threaded portion adapted to coact with the threads of said openings, and a nose lever pivoted upon said connecting member.

7. In eyeglass construction, in combination, an eyeglass frame having a pair of substantially registering end members, one of said end members having an opening therethrough having a threaded portion and an unthreaded portion, and the other of said end members having an opening registering with said first opening and threaded, a connecting screw adapted to secure said end members together having a portion adapted to mate with said unthreaded portion of said first opening and being shaped to be brought into threaded engagement with the threads of either of said openings exclusively of the other, and a nose lever pivoted upon said screw.

8. In eyeglass construction, in combination, an eyeglass frame member having a pair of substantially registering end members, one of said end members having a projecting part and an opening passing through said projecting part, said opening having a threaded portion and an unthreaded portion, the other of said end members having a recess with which said projecting part mates and having a threaded opening at said recessed portion registering with said first opening, a connecting member adapted to secure said end members together having a portion adapted to mate with said unthreaded portion of said first opening and a threaded portion adapted to coact with the threads of said openings, and a nose lever pivoted upon said connecting member.

In testimony whereof, I have signed my name to this specification this twenty-second day of January A. D., 1921.

ALFRED VEILLETTE.